B. G. LAMME.
UNIVERSAL MOTOR.
APPLICATION FILED AUG. 7, 1914.

1,244,511.

Patented Oct. 30, 1917.

WITNESSES:
R.J. Fitzgerald.
J. C. Davis.

INVENTOR
Benjamin G. Lamme.
BY
Curley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

UNIVERSAL MOTOR.

1,244,511.     Specification of Letters Patent.     Patented Oct. 30, 1917.

Application filed August 7, 1914. Serial No. 855,603.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Universal Motors, of which the following is a specification.

My invention relates to alternating current electric motors of the so called "universal" type which are adapted to operate at substantially the same speed and power output whether supplied with direct current or with alternating current of the rated voltage.

The object of my invention is to provide simple and effective means for automatically adjusting the field strength of the motor in accordance with the character of the current supplied thereto.

Substantially all universal motors are of the series wound, commutating type. When a motor of this character, rated, for example, at 110 volts, is operated by direct current there may be a drop of substantially 10 volts in the field and 100 volts in the armature, and a certain definite speed will be obtained. When the same motor is placed on a 110 volt alternating current circuit there may be a drop of, for example, 60 volts in the field and about 90 volts in the armature, because of the fact that the field winding is opposing its alternating current reactance as well as its ohmic resistance to the flow of current therethrough. As a result, the machine operates at much lower speed, owing to the reduction in armature voltage. In order to render the speed substantially the same on alternating current that it is on direct current, it becomes necessary to weaken the field, and this is most effectively done by decreasing the number of turns in the field winding, incidentally reducing the reactance thereof. By my invention, I may perform this operation automatically in any one of a number of ways, all of which are simple and effective.

Figure 1:
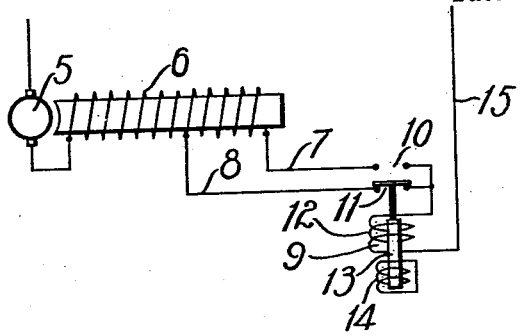
Figure 2:
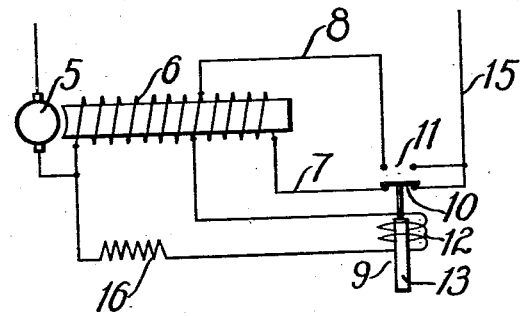
Figure 3:
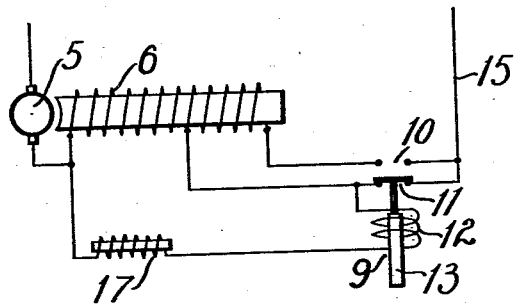
Figure 4:
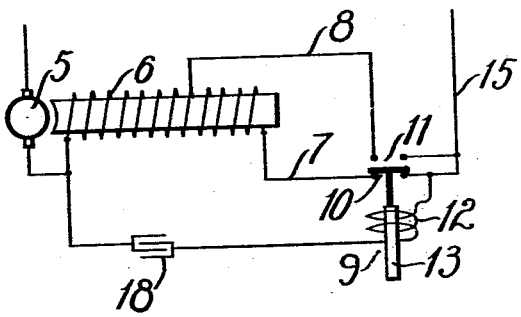

Referring to the accompanying drawing, Figure 1 is a diagrammatic view of a series commutating motor, with its attendant control switch, constructed in accordance with my invention; and Figs. 2, 3, and 4 are diagrammatic views of modifications thereof.

Referring especially to Fig. 1, 5 is the armature of a single-phase series commutating motor provided with a field winding 6 which may be supplied with current by either of two tap wires 7 and 8. The tap wire 7 supplies current to all the turns of the winding 6, whereas the tap wire 8 supplies current to only a portion thereof. A gravity or spring-controlled electromagnetic switch 9 is provided with two sets of contact members 10 and 11 associated respectively with the tap wires 7 and 8 and adapted, when closed, to supply current thereto. The electromagnetic switch 9 includes a solenoid 12, a core member 13 therein, and a short circuited winding 14 which embraces the lower portion of the core member 13. The solenoid 12 is connected between a line wire 15 and the right hand contact members of the contact pairs 10 and 11.

Having thus described the structure of my device, the operation is as follows: The switch is normally biased by gravity to the lower position shown where connection is made between the contact members 11. When the motor is energized by alternating current, an alternating magnetic flux is set up in the core 13, and currents are induced in the short circuited winding 14 which, at all times, are substantially 180° out of phase with the current flowing in the winding 12, in accordance with the well known transformer action. As a result, the magnetic pull of the solenoid 12 upon the core member 13 will be almost entirely neutralized, and the switch 19 will remain in its lower position, allowing current to flow to a portion only of the field winding 6 through the tap wire 8. When, on the other hand, the motor is supplied with direct current, there will be no transformer action between the coils 12 and 14, and the solenoid 12 will draw up the core 13, closing the connection between the contact members 10 and supplying current to all the turns of the field winding

6 through the tap wire 7. It is thus seen that the switch 9 provides simple and effective means for automatically energizing a large number of turns in the field winding when the motor is supplied with direct current, and a few turns only when the motor is supplied with alternating current.

Referring to the form of my invention shown in Fig. 2, which is, in many respects, similar to that of Fig. 1 and in which corresponding parts are similarly numbered, as far as possible; the solenoid 12, which actuates the switch 9, is connected in shunt relation to the portion of the field winding 6 which is energized by either type of current. The winding 12 may be of high ohmic resistance in itself or it may be connected in series with a resistance element 16, as shown. When the motor is energized by direct current, the resistance of the member 16 is of such value, relative to the resistance of the portion of the field winding 6 in shunt relation thereto, that insufficient current flows through the winding 12 to cause the latter to draw up the core member 13. The switch 9 therefore remains biased to its lower position, and the direct current energizes the entire field winding 6 through the tap wire 7. When, however, the motor is supplied with alternating current, the combined resistance and reactance of the shunted portion of the field winding 6 is sufficient to divert enough current through the winding 12 to cause it to draw up the core member 13, with attendant closing of the connection between the contact members 11 and the energization of a portion only of the field winding 6 through the tap wire 8 and weakening of the field with respect to its value on direct current.

The modification shown in Fig. 3 is similar in its action to that shown in Fig. 2, except that the shunt path, including the winding 12, is of low ohmic resistance and high reactance, as indicated by the reactance coil 17. On alternating current, the reactance of the said shunt path is so great that the winding 12 is not energized sufficiently to draw up the core member 13, and a portion only of the field winding 6 is energized. On direct current, the ohmic resistance of the shunt path, including the reactance device 17, is sufficiently low to allow the passage of enough current to cause the winding 12 to draw up the core member 13 with consequent closing of the connection between the contact members 10 and the energization of the entire field winding 6.

The modification shown in Fig. 5 is very similar in its operation to that shown in Fig. 2, except that the resistance member 16 is replaced by a condenser 18 and the winding 12 is connected around the entire field winding 6 and switch 9. On direct current, the winding 12 will not be energized because of the inability of current of this character to traverse the condenser 18, and the circuit between the contact members 12 will remain closed, with consequent energization of the entire field winding 6. On alternating current, however, the winding 12 will be energized, the core member 13 drawn up, and a circuit completed through the contact members 11, with consequent energization of a portion only of the field winding 6 and with attendant weakening of the field with respect to the value it had when excited by direct current.

The operation of the electromagnetic switch in each form of my device tends to alter the strength of the operating field thereof and, therefore, might cause chattering but the different switches may be readily designed so that the momentum initially imparted to the armature suffices to cause the moving contact member to travel to the new closed-circuit position.

While I have shown my invention in only four distinct modifications, it is obvious to those skilled in the art that it is susceptible of various additional minor changes and modifications without departing from the spirit thereof, and I accordingly desire that no restrictions shall be placed thereupon except such as are specifically set forth in the appended claims.

I claim as my invention:

1. The combination with an electric motor of the commutator type provided with a field winding, of an electromagnetic switch provided with an operating winding, a closed winding in inductive relation to said operating winding, connections from said operating winding to the circuit of said motor, said switch being responsive to direct current and non-responsive to alternating current by virtue of transformer action exerted by said operating winding upon said closed winding, and connections whereby said switch, when operated, causes the energization of additional turns in the field winding of said motor.

2. The combination with an electric motor of the commutator type provided with a field winding, of an electromagnetic switch and attendant connections arranged to modify the field excitation of said motor by its operation, said switch being provided with an operating winding and with a short circuited winding in inductive relation thereto and being responsive to direct current and not to alternating current by virtue of the magnetic effect of said short-circuited winding upon said operating winding.

3. The combination with a dynamo-electric machine of the commutator type provided with a field winding, of a solenoid in conductive connection with said winding, a switch embodying and operated by a core which is arranged to be actuated by said solenoid, connections whereby said switch, when operated, energizes additional turns in the field winding of said dynamo-electric machine, and an auxiliary short circuited winding inductively interlinked with said solenoid for neutralizing the flux thereof when said solenoid is energized by alternating current.

In testimony whereof, I have hereunto subscribed my name this 29th day of July, 1914.

BENJ. G. LAMME.

Witnesses:
E. LIVINGSTONE,
B. B. HINES.